United States Patent [19]

Sugano

[11] Patent Number: 4,967,611

[45] Date of Patent: Nov. 6, 1990

[54] SHIFT SCHEDULING IN AUTOMATIC TRANSMISSION WITH THROTTLE MODIFIER AND PARTIAL THROTTLE PRESSURES

[75] Inventor: Kazuhiko Sugano, Yokohama, Japan

[73] Assignee: Nissan Motor Co., Ltd., Yokohama, Japan

[21] Appl. No.: 264,702

[22] Filed: Oct. 31, 1988

[30] Foreign Application Priority Data

Oct. 30, 1987 [JP] Japan .................. 62-273218

[51] Int. Cl.⁵ ............................................ B60K 41/16
[52] U.S. Cl. ........................................ 74/868; 74/870
[58] Field of Search .............. 74/868, 869, 870, 752 C

[56] References Cited

U.S. PATENT DOCUMENTS

| | | | |
|---|---|---|---|
| 3,580,112 | 5/1971 | Dach ........................... | 74/868 |
| 3,890,856 | 6/1975 | Miyauchi et al. ............. | 74/868 X |
| 4,106,369 | 8/1978 | Taga ............................. | 74/868 X |
| 4,282,781 | 8/1981 | Iwanaga et al. .............. | 74/868 X |
| 4,296,651 | 10/1981 | Iwanaga et al. ............. | 74/869 |
| 4,313,354 | 2/1982 | Iwanaga et al. .............. | 74/868 X |
| 4,334,442 | 6/1982 | Iwanaga et al. .............. | 74/868 X |
| 4,347,764 | 9/1982 | Lauven .......................... | 74/868 X |
| 4,432,255 | 2/1984 | Borman et al. ............... | 74/868 X |
| 4,537,095 | 8/1985 | Morisawa ...................... | 74/869 X |
| 4,680,989 | 7/1987 | Sykora et al. ................. | 74/868 X |

Primary Examiner—Dirk Wright
Attorney, Agent, or Firm—Foley & Lardner, Schwartz, Jeffery, Schwaab, Mack, Blumenthal & Evans

[57] ABSTRACT

A hydraulic system for an automatic transmission comprises a governor valve generating a governor pressure, a throttle valve generating a throttle pressure, a throttle modifier valve generating a throttle modifier pressure which is an amplified pressure of the throttle pressure and thus higher than said throttle pressure, a throttle opening detecting valve generating a partial throttle pressure, and a shift valve. The shift valve has a spool subject to the governor pressure to be biased toward an up position thereof. The spool has a pressure acting area which is exposed to the throttle modifier pressure when the spool is in a down position thereof. This pressure acting area is exposed the partial throttle pressure when the spool is in the up position thereof.

9 Claims, 5 Drawing Sheets

| | | R/C | H/C | F/C | O/C | B/B 2A | B/B 3R | B/B 4A | L&R/B | F/O | L/O | GEAR RATIO | α1 = 0.45, α2 = 0.45 |
|---|---|---|---|---|---|---|---|---|---|---|---|---|---|
| D RANGE | ENGINE DRIVING 1ST | | | ○ | | | | | | ○ | ○ | $\frac{1+\alpha_1}{\alpha_1}$ | 3.22 |
| | ENGINE DRIVING 2ND | | | ○ | | | ○ | | | ○ | | $\frac{\alpha_1+\alpha_2+\alpha_1\alpha_2}{\alpha_1(1+\alpha_2)}$ | 1.69 |
| | ENGINE DRIVING 3RD | | ○ | ○ | | ○ | | | | ○ | | 1 | 1 |
| | ENGINE DRIVING 4TH | | ○ | (○) | | ○ | ○ | ○ | | | | $\frac{1}{1+\alpha_2}$ | 0.69 |
| | ENGINE BRAKING 1ST | | | (○) | ○ | | | | | | | | |
| | ENGINE BRAKING 2ND | | ○ | (○) | ○ | ○ | ○ | | | | | | |
| | ENGINE BRAKING 3RD | | ○ | (○) | ○ | ○ | ○ | | | | | | |
| | ENGINE BRAKING 4TH | | | (○) | | ○ | ○ | ○ | | | | | |
| 2ND RANGE | 1ST | | | ○ | | | | | | ○ | ○ | | |
| | 2ND | | | ○ | | | ○ | | | ○ | | | |
| 1ST RANGE | 1ST | | | ○ | | | | | ○ | ○ | | | |
| REVERSE | | ○ | | | | | | | ○ | | | $-\frac{1}{\alpha_2}$ | -2.22 |

( ) UNRELATED TO POWER TRANSMISSION

SHIFT SCHEDULING IN AUTOMATIC TRANSMISSION WITH THROTTLE MODIFIER AND PARTIAL THROTTLE PRESSURES

BACKGROUND OF THE PRESENT INVENTION

The present invention relates to a hydraulic control system for an automatic transmission, and more particularly to a less complicated valving circuit for determining a desired shift schedule in an automatic transmission.

Figure 6:
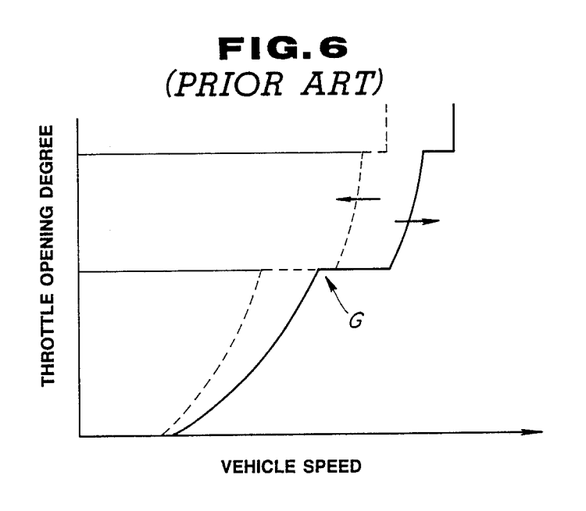
FIG. 6 is a shift schedule diagram provided according to the prior art discussed above.

A known hydraulic control system for automatic transmission is disclosed on Page 56 of a publication entitled "THM700-R4 PRINCIPLES OF OPERATION" published by General Motors in July 1983. In this known hydraulic control system, a modulated throttle valve up and a modulated throttle valve down are provided in addition to a throttle valve. The modulated throttle valve down reduces a throttle pressure generated by the throttle valve to generate a modulated throttle valve down pressure which is a relatively high throttle related pressure. The modulated throttle valve up reduces the throttle pressure to generate a modulated throttle valve up pressure which is a relatively low throttle related pressure. The modulated throttle valve down pressure acts on a 3-4 shift valve against governor pressure when the shift valve is in a down position thereof, whereas the modulated throttle valve up pressure acts on the 3-4 shift valve against governor pressure when the shift valve is in an up position thereof, inducing hysteresis between upshift and downshift of the shift valve. In this hydraulic control system, the shift valve is subject also to a partial throttle pressure. The partial throttle pressure is zero at throttle opening degrees ranging from zero to half ($\frac{1}{2}$) of the wide open throttle opening degree, and becomes as high as the throttle pressure at throttle opening degrees ranging from the half to the wide open throttle opening degree. Considering now an upshift schedule line and a downshift schedule line drawn in a graph having throttle opening values on a vertical axis and vehicle speed values on a horizontal axis, these lines are discontinuous in the vicinity of the half ($\frac{1}{2}$) of the wide open throttle opening degree. Within a range where the throttle opening degree is smaller than the half of the wide open throttle opening degree, the shift schedule lines are shifted toward low vehicle speed side, whereas within a range where the throttle opening degree is larger than the half of the wide open throttle opening degree, they are shifted toward high vehicle speed side. These shift schedule lines are shown in FIG. 6. As shown in FIG. 6, that portion of the downshift schedule line (drawn by broken line) which results from connecting downshift points at throttle opening degrees ranging from the half ($\frac{1}{2}$) to the wide open throttle opening degree is disposed on the higher vehicle speed side than that portion of the upshift schedule line (drawn by full line) which results from connecting upshift points at throttle opening degrees ranging from zero throttle opening degree to the half ($\frac{1}{2}$) of the wide open throttle opening degree. Thus, the hysteresis disappears at certain vehicle speeds during operation with a throttle opening degrees around the half ($\frac{1}{2}$) of the wide open throttle opening degree. This is indicated by the reference character G in FIG. 6. This is where the shift valve tends to undergo hunting.

As shown in FIG. 6, the downshift and upshift schedule lines are similar in shape, so that hysteresis at small throttle opening degrees and that at large throttle opening degrees are basically alike. Thus, appropriate setting of hysteresis over the whole range of throttle openings is very difficult. It is preferable that the downshift schedule line be shifted toward low vehicle speed side as being sufficiently separated from the upshift schedule line at small throttle opening degrees to provide an appropriate hysteresis. However, if it is so set, the downshift schedule line is separated too much from the upshift schedule line at large throttle opening degrees. This provides inappropriate substantially great hysteresis.

In the known hydraulic control system, two modulated throttle valves are required to generate the modulated throttle valve up and down pressures which are lower than the throttle pressure. This results in complicated circuit structure.

An object of the present invention is to provide a hydraulic system for controlling a shift in an automatic transmission such that, with reduced number of valves and thus with simple circuit structure, the above-mentioned problems are solved.

SUMMARY OF THE INVENTION

According to the present invention, the above-mentioned problems have been solved by using a throttle modifier pressure which results from amplification of a throttle pressure in addition to a partial throttle pressure and having the throttle modifier pressure on a shift valve act against a governor pressure when the shift valve is in an upshift position thereof and the partial throttle pressure on the shift valve against the governor pressure when the shift valve is in the downshift position.

According to the present invention, there is provided a hydraulic system for an automatic transmission, including: means for generating a governor pressure, means for generating a throttle pressure variable with throttle opening degree, throttle modifier valve means for generating a throttle modifier pressure which is an amplified pressure of said throttle pressure, means for generating a partial throttle pressure which is zero at throttle opening degrees ranging from zero to a predetermined throttle opening degree, but becoming as high as said throttle pressure at throttle opening degrres greater than said predetermined throttle opening degree, a shift valve including a spool having a down position and an up position, the spool means being subject to said governor pressure, said spool means being subject to said throttle modifier pressure to be urged against the governor pressure when the spool means is in the down position, and the spool being subject to the partial throttle pressure to be urged against the governor pressure when the spool is in the up position.

DETAILED DESCRIPTION OF THE INVENTION

Figure 2:
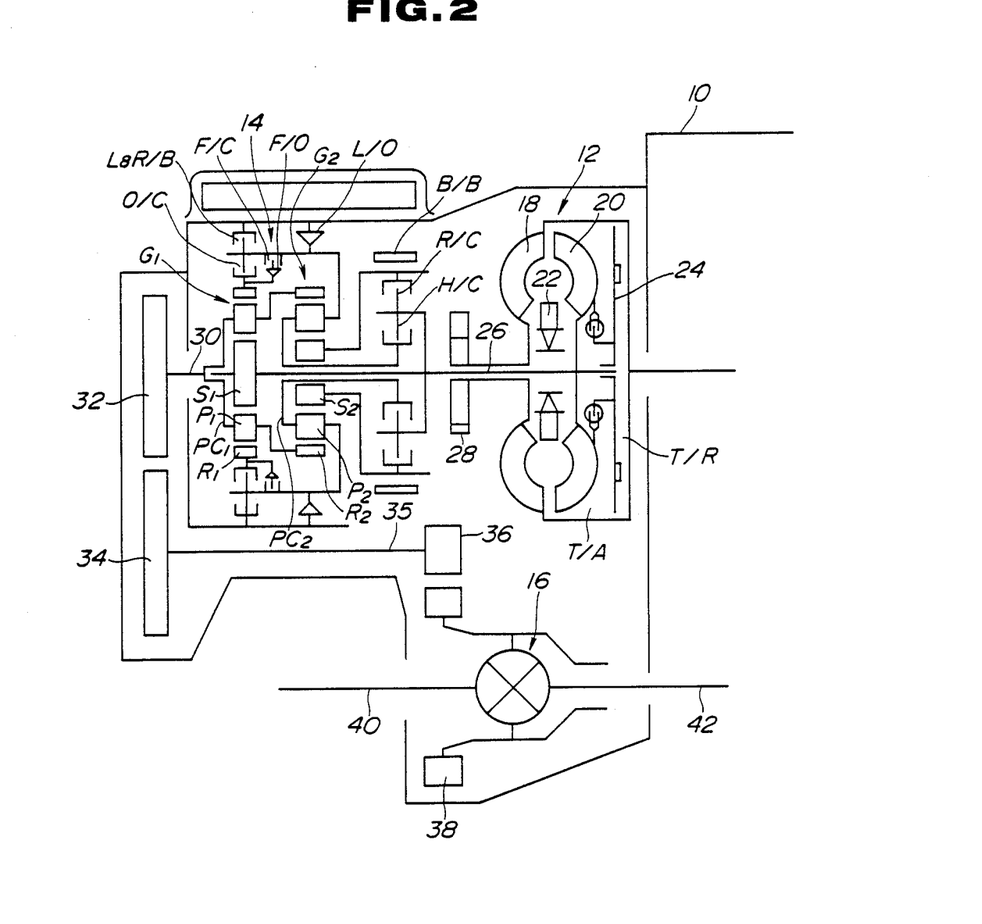
FIG. 2 is a diagram line of a power train of a transaxle including the automatic transmission.

Referring to FIG. 2, there is shown a diagram line of an automatic transmission (automatic transaxle). That is, the reference numeral 10 designates an engine which is suitable for transverse mount with regard to the longitudinal direction of a vehicle. Torque of the engine is supplied to a torque converter 12 on a pump impeller 18 thereof. In addition to the torque converter 12, the automatic transmission comprises a change speed planetary gear box 14, and a differential unit 16. In addition to the pump impeller 18, the torque converter 12 includes a turbine runner 20 and a stator 22. It also includes a lock-up clutch 24 for establishing a mechanical drive connection between the pump impeller 18 and turbine runner 20. When the lock-up clutch 24 is disengaged or released, torque is transmitted via hydraulic fluid from the pump impeller 18 to the turbine runner 20 and then to a transmission input shaft 26 drivingly connected to the turbine runner 20. When the lock-up clutch 24 is engaged, the torque is transmitted via a mechanical connection between the pump impeller 18 and turbine runner 20 to the input shaft 26. The lock-up clutch 24 is activated in response to a pressure differential between an apply chamber T/A and a release chamber T/R. The pump impeller 18 is drivingly connected to an oil pump 28 so that the engine drives the oil pump 28.

The change speed planetary gear box 14 comprises a first planetary gear set $G_1$ and a second planetary gear set $G_2$. The first planetary gear set $G_1$ includes a first sun gear $S_1$, a first internal or ring gear $R_1$, and a first pinion carrier $PC_1$. The first pinion carrier $PC_1$ rotatably supports at least one planet pinion $P_1$ meshing with the sun and ring gears $S_1$ and $R_1$. The second planetary gear set $G_2$ comprises a second sun gear $S_2$, a second internal or ring gear $R_2$, and a second planet pinion carrier $PC_2$. The second pinion carrier $PC_2$ rotatably supports at least one planet pinion $P_2$ meshing with the second sum and ring gears $S_2$ and $R_2$. The first sun gear $S_1$ is drivingly connected to the input shaft 26, while the first pinion carrier $PC_1$ and second ring gear $R_2$ are drivingly connected to a transmission output shaft 30.

Via a serially connected forward one-way clutch F/O and forward clutch F/C, the first ring gear $R_1$ is drivingly connectable to the second pinion carrier $PC_2$. An overrunning clutch O/C is arranged in parallel to the serially connected forward one-way clutch F/O and forward clutch F/C. Via this overrunning clutch O/C, the first ring gear $R_1$ is drivingly connectable to the second pinion carrier $PC_2$. The second sun gear $S_2$ is drivingly connectable via a reverse clutch R/C to the input shaft 26. The second pinion carrier $PC_2$ is drivingly connectable via a high clutch H/C to the input shaft 26. The second sun gear $S_2$ is adapted to be held stationary relative to a transmission casing via a band brake B/B. The second pinion carrier $PC_2$ is adapted to be held stationary relative to the casing via a low one-way clutch L/O or a low & reverse brake L&R/B which is arranged in parallel to the low one-way clutch L/O. The output shaft 30 has an output gear 32 rotatable therewith. An idler shaft 35 is rotatably mounted in the transmission casing and extends in parallel to the output shaft 30. An idler gear 34 is connected to the idler shaft 35 for rotation therewith at one end portion thereof. At the opposite end portion, the idler shaft 35 has a reduction gear 36 for rotation therewith. The idler gear 34 is in mesh with the output gear 32, while the reduction gear 36 in mesh with a ring gear 38 of the differential unit 16. The differential unit 16 has drive axles 40 and 42 extending outward in the opposite directions. These drive axles 40 and 42 are drivingly connected to a left front wheel and a right front wheel, respectively.

Figure 3:
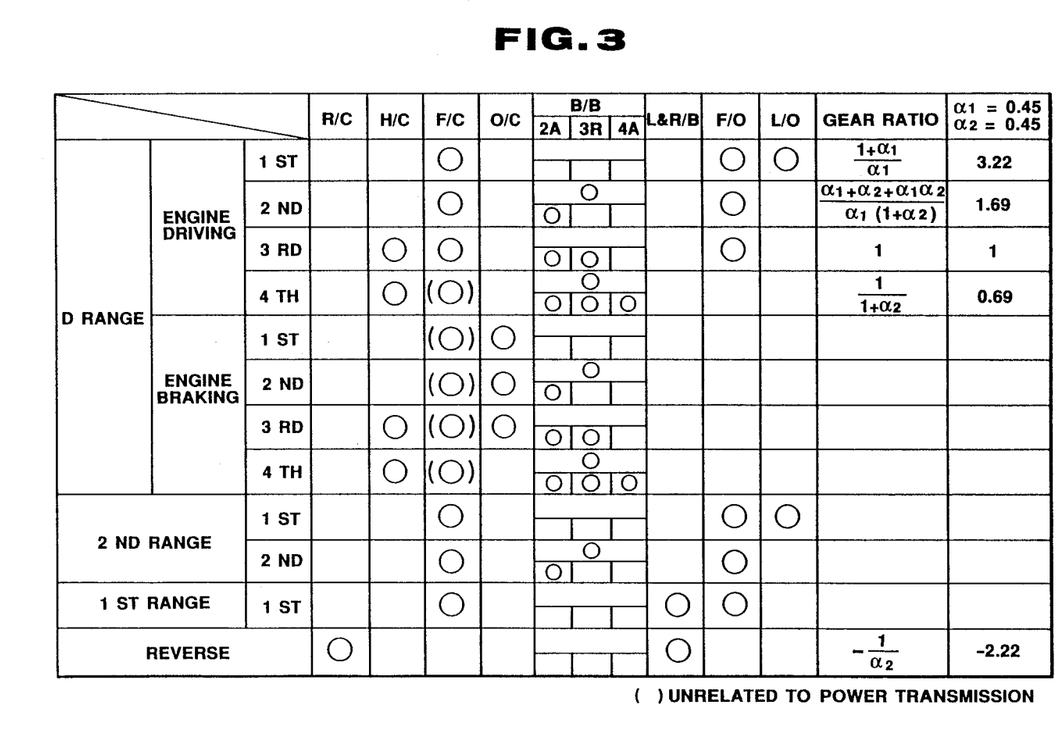
FIG. 3 is a table showing a shift schedule of the automatic transmission.

In the change speed planetary gear box 14, varying a selected one or a selected combination of the clutches F/C, H/C, O/C, and R/C, the brakes B/B and L&R/B, and the one-way clutches F/O and L/O which are to be activated or engaged will cause a shift in rotating state of planetary gear elements $S_1$, $S_2$, $R_1$, $R_2$, $PC_1$, and $PC_2$ of the planetary gear sets $G_1$ and $G_2$, causing a change in the rotational speed of the output shaft 30 relative to the rotational speed of the input shaft 26. More specifically, activating one of or a combination of the clutches, brakes, and one-way clutches in a schedule as illustrated in the TABLE in FIG. 3 will cause a shift between four forward speed ratios in various modes and a reverse speed ratio. In FIG. 3, the sign o indicates that a particular frictional device is activated or engaged. If the particular friction device is a clutch or a brake, the abovementioned sign o indicates the engagement of the clutch or brake, while if the particular friction device is a one-way clutch, the sign o indicates activation of the one-way clutch. The reference numerals 2A, 3R, and 4A arranged in a row below the reference numeral B/B indicate a second speed apply chamber 2A, a third speed release chamber 3R and a fourth speed apply chamber 4A of a hydraulic pressure operated servomotor for tightening the band brake B/B. The reference sign o indicates supply of hydraulic fluid pressure to a particular chamber. The reference characters $\alpha_1$ (alpha one) and $\alpha_2$ (alpha two) express a ratio of number of teeth of the sun gear $S_1$ to number of teeth of the ring gear $R_1$, and a ratio of number of teeth of the sun gear $S_2$ to number of teeth of the ring gear $R_2$, respectively. A gear ratio is a ratio of rotational speed of the input shaft 26 to rotational speed of the output shaft 30.

Owing to the change speed operation by the planetary gear box 14, rotating the input shaft 26 at a rotational speed causes the output shaft 30 to rotate at a rotational speed decreased or increased from the rotational speed of the input shaft 26. Torque of the output shaft 30 is transmitted via an output gear 32, idler gear 34, reduction gear 36 to the ring gear 38 of the differential unit 16. This causes the drive axles 40 and 42 to drive the left and right front wheels 40 and 42. As a result, an automatic shift among four forward speed ratios including an overdrive can be effected.

Figure 4:
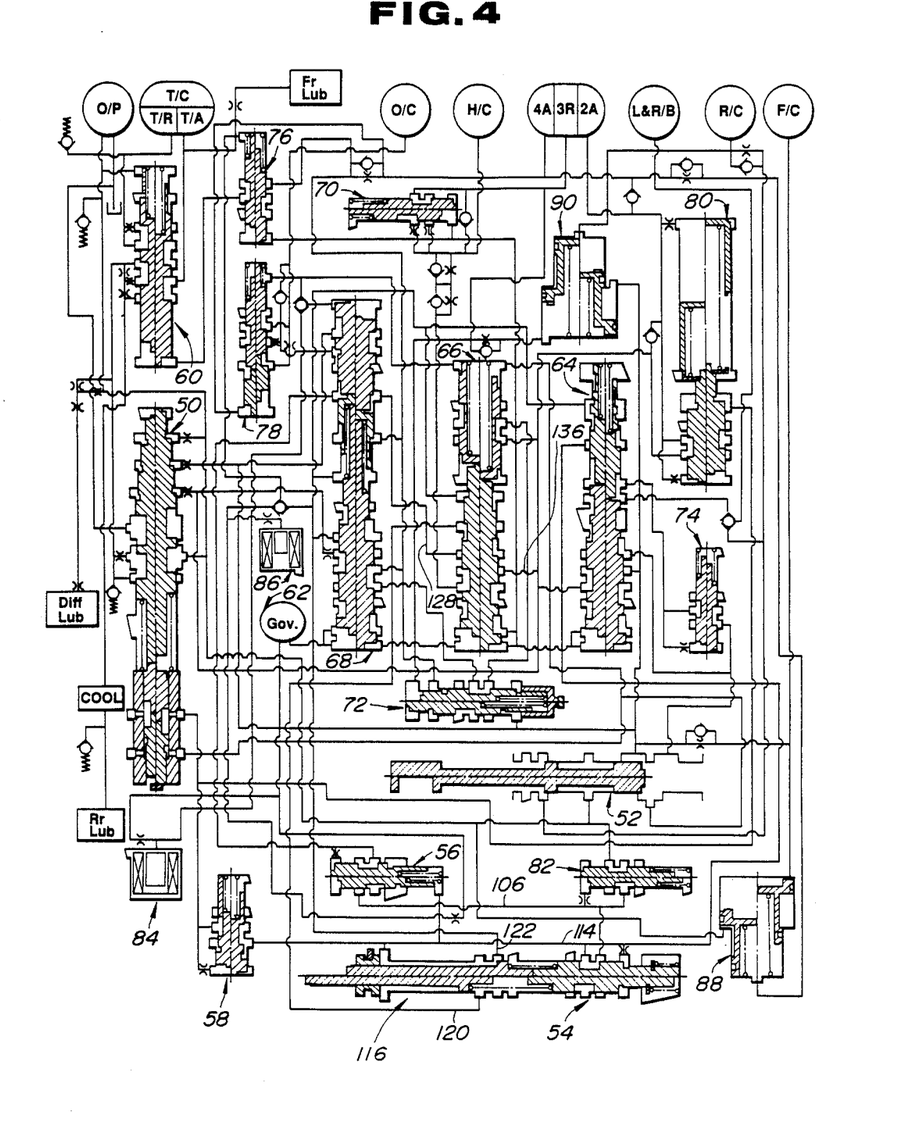
FIG. 4 is a hydraulic circuit of the hydraulic control system for the automatic transmission.

FIG. 4 shows a hydraulic circuit of a hydraulic control system for controlling the above-mentioned power train.

This hydraulic control system comprises the following valves: a pressure regulator valve 50, a manual valve 52, a throttle valve 54, a throttle modifier valve 56, a pressure modifier valve 58, a lock-up control valve 60, a governor valve 62, a 1-2 shift valve 64, a 2-3 shift valve 66, a 3-4 shift valve 68, a 3-2 timing valve 70, a 4-2 sequence valve 72, a manual first range pressure reduction valve 74, a vehicle speed cutoff valve 76, an overrunning clutch control valve 78, a 1-2 accumulator valve 80, a kickdown modifier valve 82, an overdrive inhibitor solenoid 84, an idle solenoid 86, a N-D accumulator 88, and a servo release accumulator 90. These valve are operatively interconnected as illustrated in FIG. 4. They are connected also to an oil pump O/P, the apply chamber T/A and the release chamber T/R of the torque converter 12, the clutches R/C, H/C, O/C, and F/C, the brake L&R/B, and three chambers 2A, 3R, and 4A of the band brake B/B as illustrated in FIG. 4. Owing to this circuit structure, the appropriate one or the appropriate combination of the clutches R/C, H/C, O/C, and F/C, and the brakes L&R/B and B/B which are to be engaged is selected in response to vehicle speed and opening degree of the engine throttle. In this disclosure, such valves which are not directly concerned with the present invention are not specifically described. The following explanation proceeds along FIG. 1 which illustrates such valves and portions, extracted from the whole system, which have close connection with the present invention in order to make it easy to understand the present invention.

Figure 1:
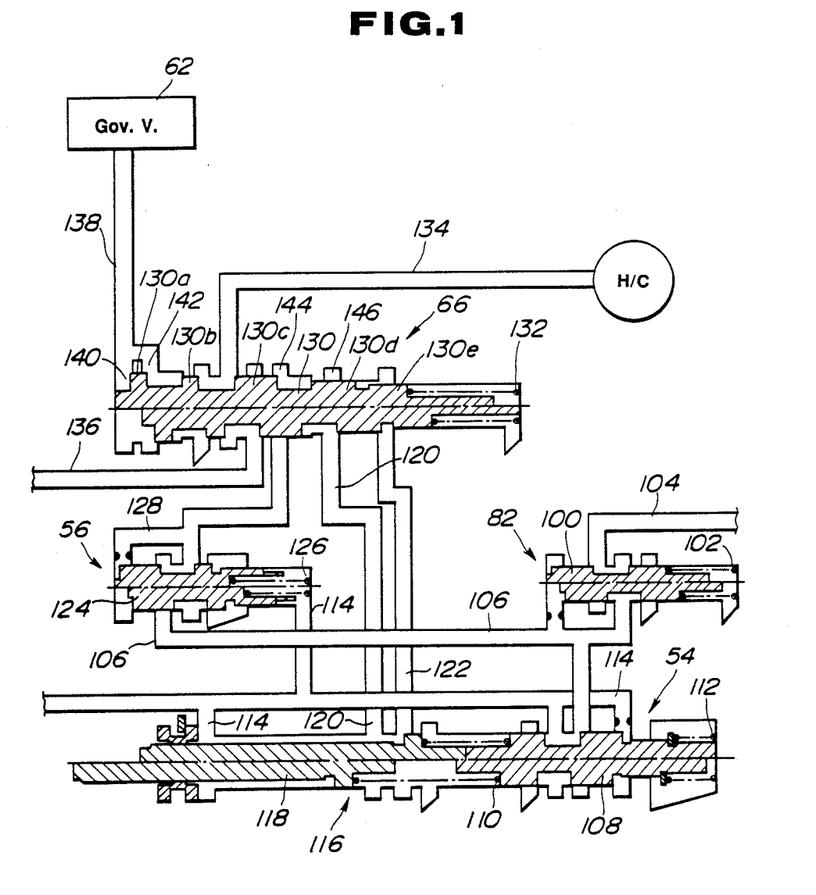
FIG. 1 is a hydraulic circuit diagram of a portion of a hydraulic control system for an automatic transmission showing a preferred embodiment according to the present invention.

Referring to FIG. 1, the kickdown modifier valve 82 is a pressure regulator valve including a spool 100 and a spring 102. This valve uses the line pressure supplied thereto via a hydraulic line 104 as a source of pressure which pressure regulation is effected on and generates a constant hydraulic pressure determined by a force of the spring 102.

The throttle valve 54 includes a spool 108 and springs 110 and 112. This valve uses the constant hydraulic pressure supplied thereto via a hydraulic line 106 as a source of hydraulic pressure which pressure regulation is effected on and generates a throttle pressure in a hydraulic line 114. The spring 110 is disposed between the spool 108 and a spool 118 of a throttle opening detecting valve 116 described later. A length of the spring 110 is variable with a position which the spool 118 takes. Since this position of the spool 118 is variable with throttle opening degree, the throttle pressure in the hydraulic line 114 is variable with the throttle opening degree.

The throttle opening degree detecting valve 116 has the spool 118 operatively linked with an accelerator pedal. The arrangement is such that the spool 118, is displaced to the right, as viewed in FIG. 1, in response to an increase in throttle opening degree as the accelerator pedal is depressed. When the throttle opening degree is increased to half ($\frac{1}{2}$) of the wide open throttle opening degree, the hydraulic line 114 is allowed to communicate with the hydraulic line 120, thus allowing the throttle pressure in the hydraulic line 114 to be transmitted to the hydraulic line 120. The hydraulic pressure in this hydraulic line 120 is called a partial throttle pressure. When the throttle opening degree is increased to the wide open throttle opening degree, the spool 118 is further displaced to the right to a position where a hydraulic pressure as high as the output pressure generated by the kickdown modifier valve 82 is supplied to a hydraulic line 122 as a kickdown pressure.

The throttle modifier valve 56 includes a spool 124 and a spring 126. This valve uses the constant hydraulic pressure supplied thereto through the hydraulic line 106 as a source of pressure which pressure regulation is effected on and generates a throttle modifier pressure in a hydraulic line 128. The throttle pressure from the hydraulic line 114 acts on one end of the spool 124 so that pressure regulation is effected to allow build-up of the throttle modifier pressure which is high enough to oppose the throttle pressure and the force of the spring 126. Therefore, the throttle modifier pressure is variable in proportion to the throttle pressure and an amplified pressure of the throttle pressure.

The 2-3 shift valve 66 includes a spool 130 and a spring 132. The spool 130 is shiftable between a down position as indicated by the upper half thereof as viewed in FIG. 1 and an up position as indicated by the lower half thereof as viewed in FIG. 1. In its down position, the spool 130 allows a hydraulic line communicating with the high clutch H/C to be drained. In its up position, the spool 130 allows the hydraulic line 134 to be connected to a hydraulic line 136 which is supplied with the line pressure. The spool 130 is subject to a governor pressure supplied thereto from the governor valve 62 via a hydraulic line 138. The governor pressure acts on the spool 130 in a direction to bias said spool 130 toward the up position thereof. The governor pressure in the hydraulic line 138 is supplied to two ports 140 and 142. Since the spool 130 has two lands 130a and 130b having different diameters, respectively, a pressure acting area which the governor pressure acts on when the spool 130 is in the down position is smaller than a pressure acting area which the governor pressure acts on when the spool 130 is in the up position, providing hysteresis. The hydraulic line 128 which the before-mentioned throttle modifier pressure is supplied to is connected to a port 144, and the hydraulic line 120 which the partial throttle pressure is supplied to is connected to a port 146. The spool 130 has lands 130c and 130d having different diameters. The land 130 has a smaller diameter than the land 130c and these lands define therebetween a pressure acting area differential. This pressure acting area differential serves as a throttle related pressure acting area. When the spool 130 is in the down position, the throttle modifier pressure in the hydraulic line 128 acts on this throttle related pressure acting area, whereas when the spool 130 is in the up position, the partial throttle pressure in the hydrulic line 120 acts on the throttle related pressure acting area. The kickdown pressure in the hydraulic line 122 acts on a pressure acting area differential formed between the lands 130d and 13e.

The operation of this embodiment is described.

Figure 5:
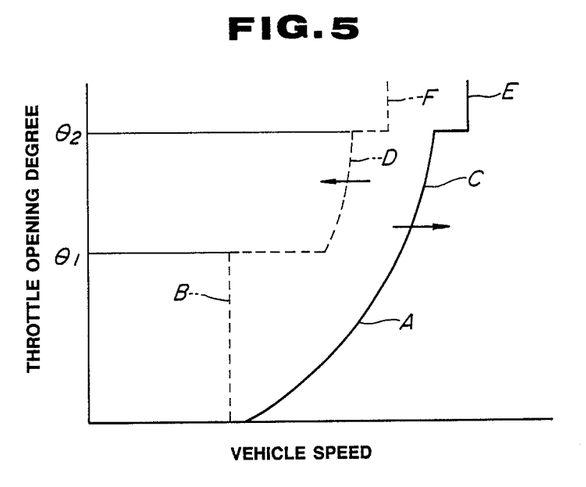
FIG. 5 is a shift schedule diagram provided according to the present invention.

At the throttle opening degrees smaller than a predetermined middle throttle opening degree $\theta_1$ (i.e., the half of the wide open throttle opening degree) as shown in FIG. 5, the throttle pressure is not supplied to the hydraulic line 120. That is, the partial throttle pressure is zero. In this state, the 2-3 shift valve 66 undergoes an upshift when the throttle modifier pressure (in the hydraulic line 138) acting on the throttle related pressure acting area against the governor pressure attains a predetermined relationship with the governor pressure. This gives an upshift schedule line as shown by the reference character A in FIG. 5. The downshift of the 2-3 shift valve 66 from the up position to the down position is effected when the governor pressure drops to a predetermined value determined by the force of the spring 132 since the hydraulic pressure applied to the port 146 is zero. Thus, the 3-2 downshift takes place at a predetermined vehicle speed regardless of the throttle opening degree. This results in providing a downshift schedule line as indicated by the reference character B in FIG. 5.

At throttle opening degrees larger than the predetermined middle throttle opening degree $\theta_1$, the throttle pressure is supplied to the hydraulic line 120. That is, the partial throttle pressure becomes as high as the throttle pressure. The upshift of the 2-3 shift valve 66 from the down position to the up position takes place in the same manner as the previous case. Thus, there is given an upshift schedule line C continuously connecting with the upshift schedule line A. The downshift of the 2-3 shift valve from the up position to the down position is effected when the partial throttle pressure which is as high as the throttle pressure acting on the throttle related pressure acting area attains a predetermined relationship with the governor pressure. This results in providing a downshift schedule line as indicated by the reference character D in FIG. 5.

At throttle opening degrees above a relatively large throttle opening degree $\theta_2$, the constant hydraulic pressure generated by the kickdown modifier valve 82 is supplied to the hydraulic line 122. Therefore, the force due to hydraulic pressure acting on the spool 130 of the 2-3 shift valve against the governor pressure greatly increases, causing shift points to shift toward the high vehicle speed side. As a result, a kickdown upshift schedule line as indicated by the reference character E and a kickdown downshift schedule line as indicated by the reference character F are given.

As shown in FIG. 5, the downshift schedule line (B, D, F) does not intersect nor overlap the upshift schedule line (A, C, E). Thus, there is no operating condition where the hunting of the 2-3 shift valve tends to take place.

As will be appreciated from the downshift schedule line B and the upshift schedule line A, there is provided sufficient hysteresis at throttle opening degrees smaller than the throttle opening degree $\theta_1$, whereas there is provided small hysteresis at throttle opening degrees larger than the throttle opening degree $\theta_1$. Therefore, more preferrable shift scheduling is now possible.

The number of valves has been reduced as compared to the before discussed prior art because what is necessary is the addition of throttle modifier pressure valve 56 which generates the throttle modifier pressure. Although in FIG. 1 the output pressure of the kickdown modifier valve 82 is used as a source of pressure, this kickdown modifier valve 82 may be eliminated if the line pressure is supplied directly to the hydraulic line 106.

What is claimed is:

1. In a hydraulic system for an automatic transmission
means for generating a governor pressure;
means for generating a throttle pressure variable with throttle opening degree;
throttle modifier valve means for generating a throttle modifier pressure which is an amplified pressure of said throttle pressure;
means for generating a partial throttle pressure which is zero at throttle opening degrees ranging from zero to a first predetermined throttle opening degree, but becomes as high as said throttle pressure at throttle opening degrees greater than said first predetermined throttle opening degree;
means for generating a kickdown pressure which is zero at throttle opening degrees ranging from zero to a second predetermined throttle opening degree that is greater than said first predetermined throttle opening degree, but becomes at least as high as said throttle pressure at throttle opening degrees greater than said second predetermined throttle opening degree; and
a shift valve including a spool having a down position and an up position, said spool being subject to said governor pressure,
said spool having a predetermined pressure acting area being subject to said throttle modifier pressure to be urged against said governor pressure when said spool is in said down position,
said predetermined pressure acting area of said spool being subject to said partial throttle pressure to be urged against said governor pressure when said spool is in the up position,
said spool of said shift valve being subject to said kickdown pressure to be urged against said governor pressure.

2. A hydraulic system as claimed in claim 1, wherein said spool has two lands defining therebetween said predetermined pressure acting area which receives said throttle modifier pressure when said spool is in the down position, said predetermined pressure acting area receiving said partial throttle pressure when said spool is in the up position.

3. A hydraulic system as claimed in claim 2, wherein said shift valve includes a spring acting on said spool means against said governor pressure.

4. In a hydraulic system for an automatic transmission:
means for generating a governor pressure;
means for generating a throttle pressure variable with throttle opening degree;
throttle modifier valve means for generating a throttle modifier pressure which is an amplified pressure of said throttle pressure;
means for generating a partial throttle pressure which is zero at throttle opening degrees ranging from zero to a first predetermined throttle opening degree, but becomes as high as said throttle pressure at throttle opening degrees greater than said first predetermined throttle opening degree;
said partial throttle pressure generating means being operative to generate a kickdown pressure which is zero at throttle opening degrees ranging from zero to a second predetermined throttle opening degree that is greater than said first predetermined throttle opening degree, but becomes at least as high as said throttle pressure at throttle opening degrees greater than said second predetermined throttle opening degree; and
a shift valve including a spool having a down position and an up position, said spool being subject to said governor pressure,
said spool having a predetermined pressure acting area being subject to said throttle modifier pressure to be urged against said governor pressure when said spool is in said down position,
said predetermined pressure acting area of said spool being subject to said partial throttle pressure to be urged against said governor pressure when said spool is in the up position,
said spool of said shift valve being subject to said kickdown pressure to be urged against said governor pressure.

5. In an automatic transmission of a motor vehicle having an engine, the automatic transmission being operable under a kickdown condition:
kickdown modifier valve means for generating a kickdown modifier pressure which is as high as a constant hydraulic pressure at least under the kickdown condition;
throttle valve means communicating with said kickdown modifier valve means for generating a throttle pressure which is controlled by said kickdown modifier pressure under the kickdown condition;

throttle modifier valve means communicating with said kickdown modifier valve means for generating a throttle modifier pressure variable in response to said throttle pressure, said throttle modifier pressure being controlled by said kickdown modifier pressure under the kickdown condition;

means communicating with said kickdown modifier valve means for generating a kickdown pressure which is controlled by said kickdown modifier pressure only under the kickdown condition; and a shift valve having a spool moveable in response to said throttle pressure, said throttle modulator pressure, and said kickdown pressure.

6. An automatic transmission as claimed in claim 5, wherein said throttle pressure, said throttle modifier pressure, and said kickdown pressure are as high as said kickdown modifier pressure under the kickdown condition, and thus as high as said constant hydraulic pressure under the kickdown condition.

7. An automatic transmission as claimed in claim 6, wherein said kickdown modifier valve means include spring means for determining the magnitude of said kickdown modulator pressure under the kickdown condition.

8. An automatic transmission as claimed in claim 7, further comprising;

line pressure regulator valve means for generating a line pressure, said line pressure being supplied to said kickdown modifier valve means, said line pressure being variable in proportion to a predetermined variable.

9. An automatic transmission as claimed in claim 8, wherein said kickdown modifier valve means communicates with said line pressure regulator valve to vary said kickdown modifier pressure as high as said line pressure when said line pressure is lower than a predetermined value, and maintain said kickdown modifier pressure at said constant hydraulic pressure when said line pressure is equal to or higher than said predetermined value.

* * * * *